Nov. 14, 1933.     R. J. KEOGH     1,935,568
ELECTRIC CURRENT CONVERTER FOR RADIO OR OTHER APPARATUS
Filed Jan. 27, 1930
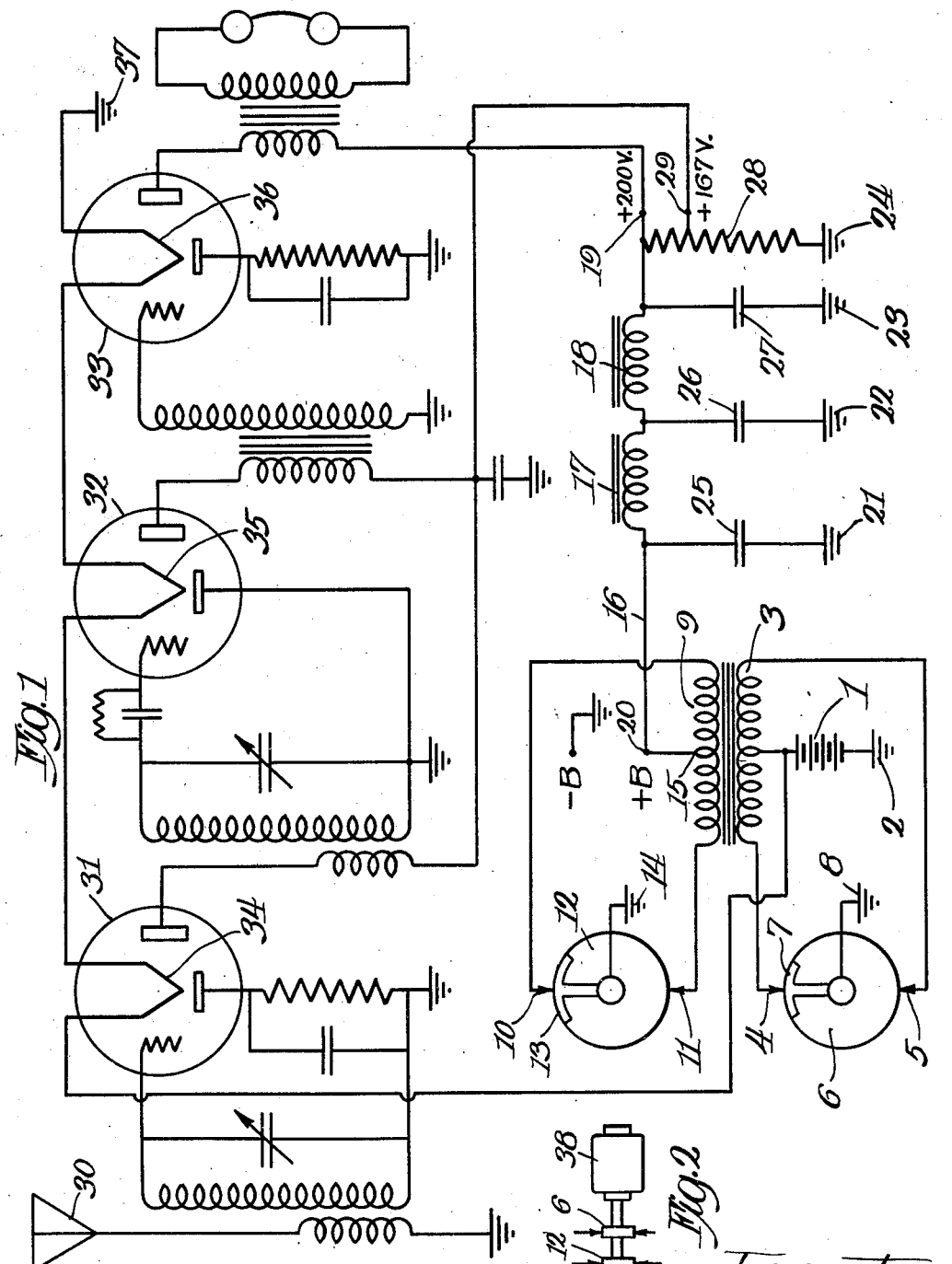
Inventor:
Raymond J. Keogh
By Arthur F. Durand
Atty.

Patented Nov. 14, 1933

1,935,568

UNITED STATES PATENT OFFICE 1,935,568

ELECTRIC CURRENT CONVERTER FOR RADIO OR OTHER APPARATUS

Raymond J. Keogh, Chicago, Ill., assignor, by mesne assignments, to Utah Radio Products Company, Chicago, Ill., a corporation of Illinois Application January 27, 1930. Serial No. 423,589

6 Claims. (Cl. 171—97)

This invention relates to apparatus for converting alternating current into direct current, and more particularly to apparatus for converting direct current, such as storage battery current, into alternating current, and then into direct current suitable for use in various ways, such as for the purpose of operating a radio receiving set.

Generally stated, therefore, the object of the invention is to provide a novel and improved arrangement involving, preferably, an interrupter and transformer for converting a direct current, such as a storage battery current, into an alternating current, in combination with means for converting the alternating current into a direct current suitable for use in a radio receiving set, or for other purposes.

More specifically considered, the object of the invention is to provide a converter of such character in which the said transformer has a divided secondary, or a secondary with a middle tap thereto, whereby every other impulse of the alternating current is reversed, so to speak, by a rectifier, resulting in a direct current as the output of said transformer converter.

It is also an object to provide certain details and features of construction and combinations tending to increase the general efficiency and the desirability of a current converter apparatus of this particular character.

To the foregoing and other useful ends, the invention consists in matters hereinafter set forth and claimed and shown in the accompanying drawing, in which—

Fig. 1 is a diagram of a radio receiving set having a current supply apparatus involving the principles of the invention; and Fig. 2 is a detail view showing diagrammatically the rotary motor portion of the current converter.

As thus illustrated, the invention comprises a storage battery 1, or other source of direct current, such as the storage battery on an ordinary automobile, or aeroplane, or motor boat, or farm lighting system. As shown, this battery has one pole grounded at 2, and has its other pole connected to the middle point of the primary 3 of a transformer. One terminal of this primary is connected to the contact 4, and the other terminal of the primary is connected to the contact 5, these contacts engaging the periphery of the rotor or commutator disk 6, as shown. The contact 7 of the rotor is preferably grounded at 8, as shown. With this arrangement, the current from the battery is caused to flow first through one part of the primary 3, and then through the other part thereof, thus setting up an alternating current in the secondary 9 of this transformer. This secondary has one terminal connected to the contact 10, and has its other terminal connected to the contact 11, which contacts engage the periphery of the rotor or commutator disk 12, which latter is similar to the one previously mentioned. The rotor 12 has a contact 13 for engaging first one contact and then the other, and this contact 13 is preferably grounded at 14, as shown. Also, it will be seen the secondary has a middle tap 15 to the middle point thereof, connected by a conductor 16 with the series impedance or choke coils 17 and 18 to the terminal 19, as shown, the connection between the point 20 and the point 19 thus provided being grounded at 21, 22, 23 and 24, as shown, through the condensers or capacity 25, 26 and 27, and through the resistance 28, which latter has a portion bridging the terminal points 19 and 29 together, as shown, the terminal points 19 and 29 being of different potential as indicated in the arrangement shown and described. With this arrangement, every other impulse or wave of the alternating current set up in the secondary 9 is reversed, so to speak, by a rotary rectifier, so that the output current through the grounds 14, 21, 22, 23 and 24 will be a direct pulsating current, and because of the choke coils 17 and 18 in the arrangement shown, this pulsating current will be changed or flattened into a practically steady or even direct current suitable for use for various purposes.

For example, as shown, the direct-to-alternating-to-direct current supply is shown in combination with a radio receiving set comprising the aerial 30, the tubes 31, 32 and 33, as shown, together with the transformer couplings and condensers and capacity indicated, the radio receiving set thus illustrated being a common and well known form, and requiring no further description. But it will be seen that direct current from the battery 1 is furnished to the filaments 34, 35 and 36 of the tubes, these filaments being in series with their ground 37 and the battery ground 2, previously mentioned. The output circuits of said tubes ordinarily have a supply of battery current, but, as shown, these plate circuits of the tubes are in shunt of the resistance 28, previously mentioned, whereby there is direct current for the plate circuit of each tube. In this way, the battery 1 serves as the primary source of supply, but the current is modified or changed, as explained, by first converting it into an alternating current and then into a direct current of the proper character for the plate circuits of the tubes. It will be seen, with the specific arrangement shown and described, which is illustrative of one form of invention, so far as its application to radio apparatus is concerned, that the potential of the plate of the tube 33 is higher than the potential of the plates of the tubes 31 and 32, because of the difference in potential at the terminal points 19 and 29, previously mentioned.

In Fig. 2, the diagram shows the motor 38 as a means for operating the two rotor disks 6 and 12, previously mentioned. It will be understood, of course, that the disks or commutators 6 and 12 can be rotated and operated by any suitable power.

There are different uses for the invention, of course, but in the operation of a radio set on an automobile, from the ordinary storage battery of the car, in the manner shown and described, the modus operandi includes the stepping up of the low potential battery current to a higher potential current suitable for the plate potential of the radio set, whereby a low potential current source becomes available not only for its ordinary uses, as on the automobile, and for the filaments of the tubes, but also for the plates of the tubes of a radio receiving set.

What I claim as my invention is:

1. In an apparatus of the character described, for deriving a direct current of given potential from a source of direct current of different potential, the combination of a source of direct current, a transformer having divided primary and secondary windings, with the two sections of the primary permanently connected together, and the two sections of the secondary also permanently connected to each other, a middle tap to said primary from said source, mechanical means having movable parts whereby the input of current from said source of direct current to said transformer is a vibratory current in the divided primary of said transformer, in combination with co-operating rectifier instrumentalities whereby the alternating output from said transformer secondary is developed into said direct current of different potential.

2. In an apparatus of the character described, for deriving a direct current of given potential from a source of direct current of different potential, the combination of a source of direct current, a transformer having divided primary and secondary windings, with a middle tap to said primary from said source, mechanical means having movable parts whereby the input of current from said source of direct current to said transformer is a vibratory current in the divided primary of said transformer, in combination with co-operating rectifier instrumentalities whereby the alternating output from said transformer secondary is developed into said direct current of different potential, said transformer primary being divided by said intermediate tap thereto, whereby the two portions of the primary are alternately included in reverse flow in the input circuit.

3. In an apparatus of the character described, for deriving a direct current of given potential from a source of direct current of different potential, the combination of a source of direct current, a transformer having divided primary and secondary windings, with a middle tap to said primary from said source, mechanical means having movable parts whereby the input of current from said source of direct current to said transformer is a vibratory current in the divided primary of said transformer, in combination with co-operating rectifier instrumentalities whereby the alternating output from said transformer secondary is developed into said direct current of different potential, said transformer secondary being divided by a middle tap thereto, whereby the two permanently connected portions of the secondary are alternately included in the ouput circuit.

4. In an apparatus of the character described, for deriving a direct current of given potential from a source of direct current of different potential, the combination of a source of direct current, a transformer having divided primary and secondary windings, with a middle tap to said primary from said source, mechanical means having movable parts whereby the input of current from said source of direct current to said transformer is a vibratory current in the permanently connected portions of the divided primary of said transformer, in combination with co-operating instrumentalities whereby the alternating output from said transformer secondary is developed into said direct current of different potential, said output circuit including inductance to modify the output pulsating direct current to a continuous direct current.

5. In an apparatus of the character described, for deriving a direct current of given potential from a source of direct current of different potential, the combination of a source of direct current, a transformer having divided primary and secondary windings, with the two sections of the primary permanently connected together, and the two sections of the secondary also permanently connected to each other, a middle tap to said primary from said source, mechanical means having movable parts whereby the input of current from said source of direct current to said transformer is a vibratory current in the divided primary of said transformer, in combination with co-operating rectifier instrumentalities whereby the alternating output from said transformer secondary is developed into said direct current of different potential, said mechanical means comprising rotary circuit closing and opening means in both said input and output circuits.

6. In an apparatus of the character described, for deriving a direct current of given potential from a source of direct current of different potential, the combination of a source of direct current, a transformer having divided primary and secondary windings, with the two sections of the primary permanently connected together, and the two sections of the secondary also permanently connected to each other, a middle tap to said primary from said source, mechanical means having movable parts whereby the input of current from said source of direct current to said transformer is a vibratory current in the divided primary of said transformer, in combination with co-operating rectifier instrumentalities whereby the alternating output from said transformer secondary is developed into said direct current of different potential, said output circuit comprising inductance and capacity therein for modifying the output pulsating direct current to a continuous direct current.

RAYMOND J. KEOGH.